Dec. 2, 1969 A. G. BODINE 3,481,027
METHOD OF SONIC PRESS FITTING
Filed Jan. 6, 1965 4 Sheets-Sheet 4
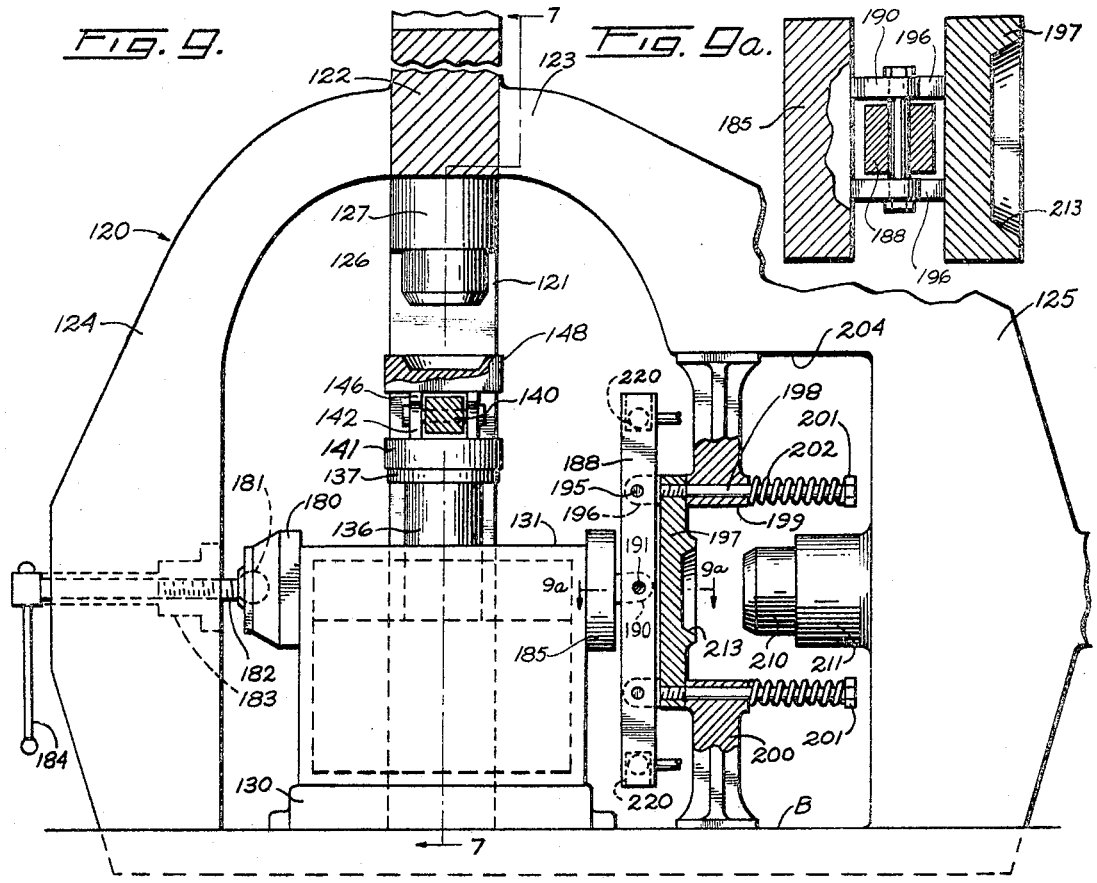
INVENTOR
ALBERT G. BODINE
By Forrest J. Lilly
ATTORNEY

United States Patent Office 3,481,027
Patented Dec. 2, 1969

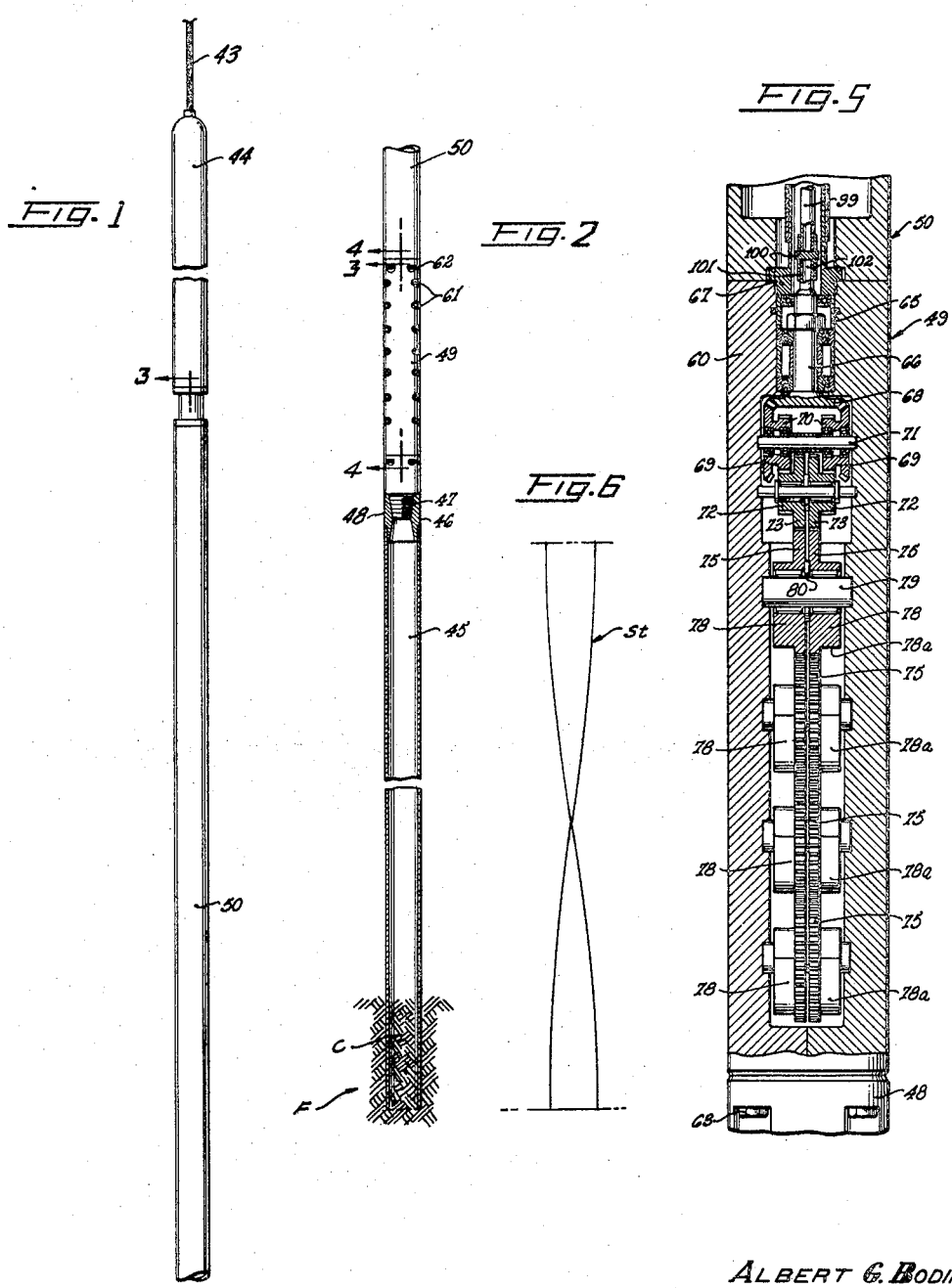

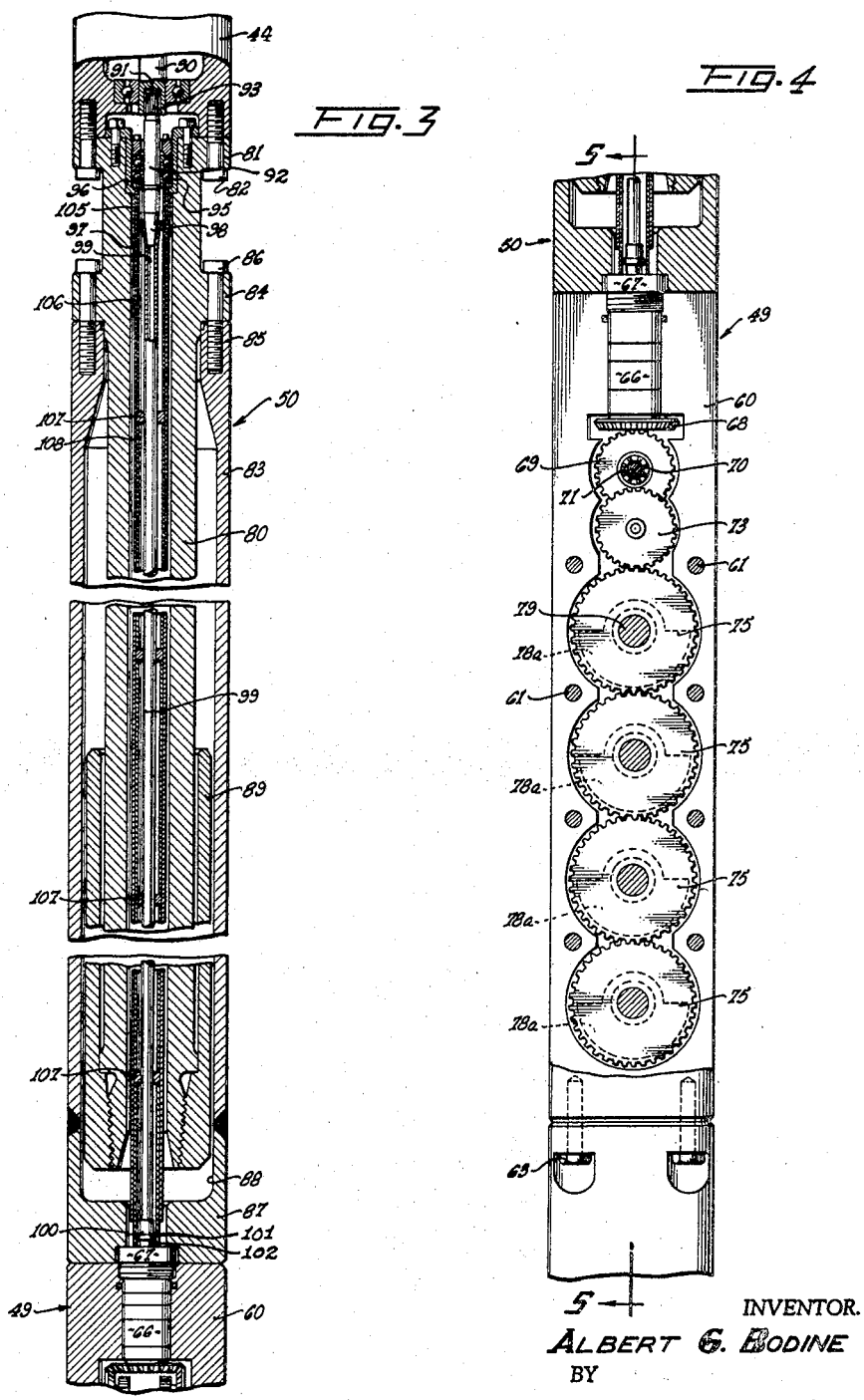

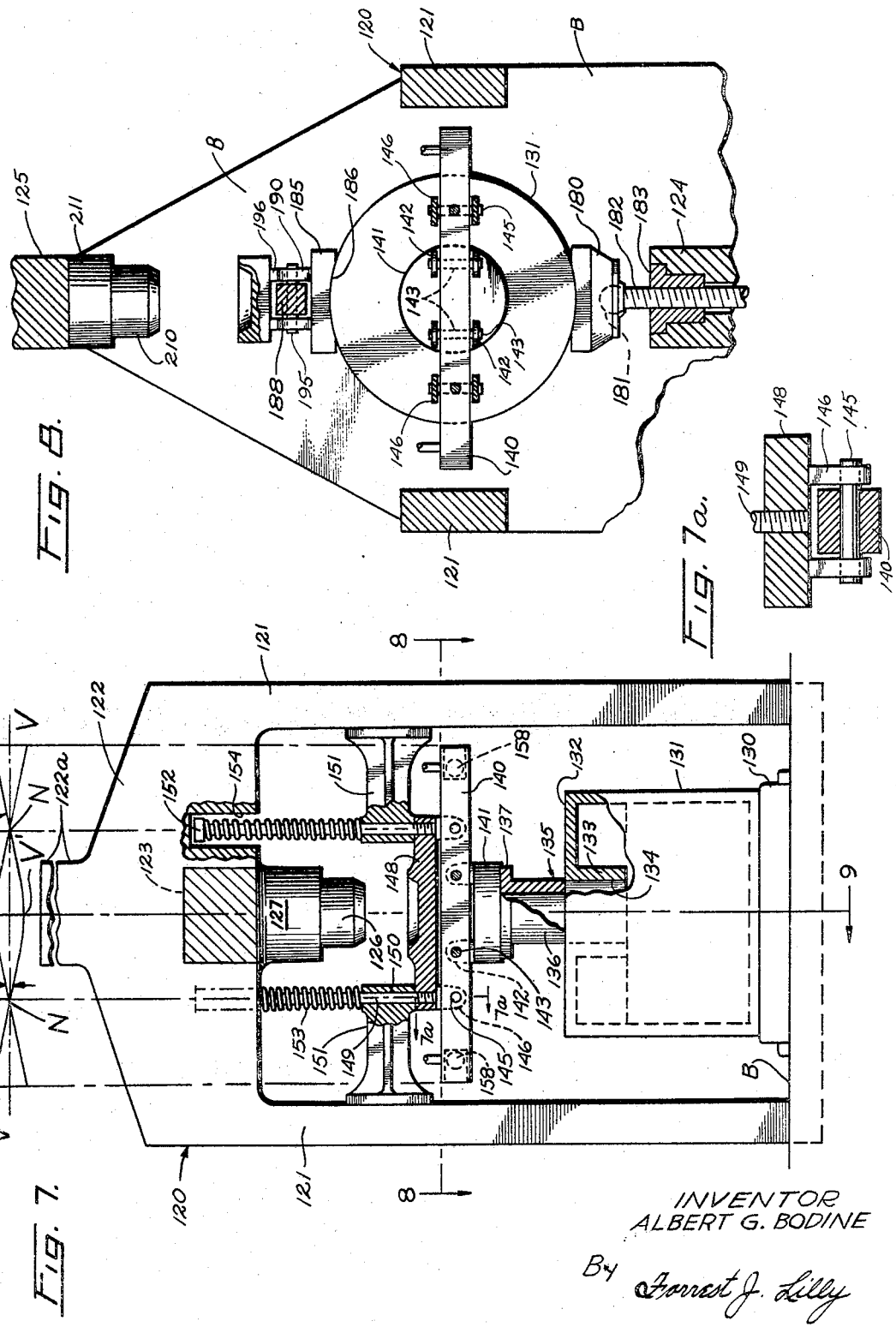

3,481,027
METHOD OF SONIC PRESS FITTING
Albert G. Bodine, Los Angeles, Calif.
(7877 Woodley Ave., Van Nuys, Calif. 91406)
Continuation-in-part of application Ser. No. 756,382,
Aug. 21, 1958. This application Jan. 6, 1965, Ser.
No. 423,771
Int. Cl. B23p 19/04
U.S. Cl. 29—525                                3 Claims

ABSTRACT OF THE DISCLOSURE

This application discloses a method and means for press-fitting elements together while subjecting the elements to sonic vibrations.

---

The present application is a continuation-in-part of my copending application Ser. No. 756,382, filed Aug. 21, 1958 now Patent No. 3,169,589, and entitled Method and Apparatus for Extruding Flowable Materials.

This invention is directed generally to the relative movement of two members along an interface therebetween in situations wherein substantial static friction exists at such interface and must be overcome to accomplish or facilitate the desired relative movement.

In the aforementioned copending application Ser. No. 756,382, there is taught a basic sonic process and apparatus for facilitating the penetration of a structural member into a surrounding structural material under conditions of high natural static friction, exemplified there as a core tube squeezed into a wall of earth material in a deep well, with the penetration facilitated by delivery of sonic energy to the site of the interface between the core tube and the earth material. In this application, the core tube can be inserted easily into the rigid and tight-fitting earthen material, and the tight-fitting core itself can also slide more easily up into the core barrel.

The present application discloses extensions of that process to the sliding of two tight-fitting mechanical parts along an interface therebetween. For example, an illustrative embodiment of the invention comprises a sonic machine for forcing a tight-fitting bushing into a hole prepared for it in another part, such as in a casting, under conditions where the parts are dimensioned for press or interference fits. More broadly considered, there is often occasion, in the assembly of commercial products, to accomplish an accurate as well as permanent mating of structural elements by dimensioning them so that they fit too tightly for easy assembly, and must therefore be forced together. For example, it is standard practice to make a bearing bushing slightly oversize, so that it has to be forced into the bore in the part which is to receive it. Various other evident applications include, without limitation, the pressing in of a wedge, a lid, a part into a slot, a shim between surfaces, a plug into a hole, a gear onto a shaft, an iron cylinder liner into an aluminum engine block, the installation of taper fitted parts, and I contemplate the whole field of assemblies where friction, interfering dimensions, or assembly force are encountered either individually or in combination. For convenience, all these are collectively included herein by the expressions friction fit, or friction contact.

It may now be stated that the general object and accomplishment of the invention is to force two tight-fitting parts together by a sliding action along a meeting interface while delivering sonic energy to one or both of the parts, so as to cause elastic vibration in one or both of said parts at said interface, and thereby facilitate the desired sliding action therebetween. One important aspect is the reflection of sonic energy at said interface, so as to free up the friction.

The present invention utilizes a number of principles of the science of sonics, and in order to make clear the sonic concepts and phenomena utilized in the invention, and referred to hereinafter, a discusion thereof will here be given.

By the expression "sonic vibration" I mean elastic vibrations, i.e., cyclic elastic deformations. In purely lumped constant systems, which I may sometimes employ and which will be referred to hereinafter, these elastic vibrations may not travel or be "propagated." In most of my systems, these elastic vibrations do travel, along elastic media, and with a characteristic velocity of propagation. If these vibrations travel longitudinally, or create a longitudinal wave pattern in a medium or structure having uniformly distributed constants of elasticity or modulus, and mass or density, this is sound wave transmission. Regardless of the vibratory frequency of such sound wave transmission, the same mathematical formulae apply, and the science is called sonics. In addition, there can be elastically vibratory systems where the essential features of concentrated density or mass appear as a localized influence or parameter, known as "lumped constant;" and another such lumped constant can be a localized or concentrated elastically deformable element, affording a local effect known as elasticity, modulus, or "stiffness." Fortunately, these constants, when functioning in an elastically vibratory system such as mine, have cooperating and mutually influencing effects like equivalent factors in alternating current. In fact, in both distributed and lumped constant systems, density or mass is mathematically equivaent to inductance (a coil); elasticity, modulus, or "stiffness" is mathematically equivalent to capacitance (a condensor); and fritcion or other pure energy dissipation is mathematically equivalent to resistance (a resistor). In all cases, the sonic vibrations used in the invention are of the sustained or continuous type, i.e., of sustained amplitude, as distinguished from the die-out type of vibrations resulting from shocks such as hammer blows.

Because of these equivalents, my elastic vibratory systems with their mass and stiffness and energy consumption, and their sonic energy transmission properties, can be viewed as equivalent circuits, where the functions can be expressed, considered, changed and quantitatively analyzed by using well proven electrical formulae.

It is important to recognize that the transmission of sonic energy into the interface or work area between two parts to be moved against one another requires the above mentioned elastic vibration phenomena in order to accomplish the benefits of my invention. There have been other proposals involving simple bodily vibration of some part. However, these latter do not result in the benefits of my sonic or elastically vibratory action.

Since sonic or elastic vibration results in the mass and elastic elements of the system taking on these special properties akin to the parameters of inductance and capacitance in alternating current phenomena, wholly new performances can be made to take place in the mechanical arts. The concept of acoustic impedance becomes of paramount importance in understanding performance. Here impedance is the ratio of cyclic force or pressure acting in the media to resulting cyclic motion, corresponding to the ratio of voltage to current. In this sonic adaptation, impedance is also equal to media density times the speed of propagation of the elastic vibration $c$.

In this invention impedance is important to the accomplishment of desired ends, such as where there is an interface. A sonic vibration transmitted across an interface between two media or two structures can experience a degree of reflection, depending upon differences of impedance. This can be caused to produce large relative vibratory motion at the interface, if desired, with the important benefit of reduction in static friction.

Impedance is also important to consider if optimized energization of a system is desired. If the impedances are adjusted to be matched somewhat, energy transmission is made very effective.

Sonic energy at fairly high frequency can have energy effects upon molecular or crystalline systems. Also, these fairly high frequencies can result in very high periodic acceleration values, typically of the order of hundreds or thousands of times the acceleration of gravity. This is because mathematically acceleration varies with the square of frequency. Accordingly, by taking advantage of this square function, I can accomplish very high forces with my sonic systems. My sonic systems preferably accomplish such high forces, and high total energy, by using a type of sonic vibration generator taught in my Patent No. 2,960,314. This type of generator is a simple mechanical device. The use of this type of sonic vibration generator in the sonic system of the present invention affords a especially simple, reliable, and commercially feasible system. Moreover, such a sonic generator is completely subjective, in that it seeks out the resonant frequency of the important elastically vibratory structure, and tends to operate in that region, generally just under peak resonance, so as to contribute important resonant amplification of the vibration of the structure.

An additional important feature of these sonic circuits is the fact that they can be made very active, so as to handle substantial power, by providing a high resonant "Q" factor. Here this factor Q is the ratio of energy stored to energy dissipated per cycle. In other words, with a high Q factor, the sonic system can store a high average level of sonic energy, to which a constant input and output of energy is respectively added and substracted. Circuit-wise, this Q factor is numerically the ratio of inductive reactance to resistance. Moreover, a high Q system is dynamically active, giving considerable cyclic motion where such motion is needed.

A valuable function of these sonic circuits is to provide enough extra capacitative reactance so that the inertia of various necessary bodies or masses in the system does not operate to the detriment of the process. For example, a mechanical oscillator or vibration generator of the type normally used in my inventions always has a body, or carrying structure, for containing the cyclic force generating means. This supporting structure, even when minimal, still has mass, or inertia. This inertia can be a force-wasting detriment, acting as a blocking impedance using up part of the periodic force output just to accelerate and decelerate this supporting structure. However, by use of elastically vibrating structure in the system, the effect of this mass, or the mass reactance resulting therefrom, is counteracted at the frequency for resonance by the opposing effect of the elasticity reactance, and when a resonant circuit is thus used, with adequate capacitance (elastic reactance), these blocking impedances are tuned out of existence, at resonance, and the periodic force generating means can thus deliver its full impulse to the "work," which is the resistive component of the impedance.

Returning to a consideration of the process of the invention, and taking for illustrative example the forcing of a bearing bushing into a tight fit, or an interference fit, into a bore in a casting, the process of the invention may be carried out by applying hydraulic pressure to the bushing to force it into the bore, and at the same time applying sonic or elastically vibratory energy to one or both of the bushing and casting, in a manner to provide vibration at the interface between the two. The possible modes of vibration are many, and the simplest case is perhaps longitudinal vibration of the bushing relative to the bore. Static friction at the engaging interface is thereby released. In many geometric cases, a Poisson's ratio type of effect is obtained, with consequent cyclic contraction of the bushing which helps in inserting of the bushing. Many refinements are possible and within the scope of the invention, and some of these will be mentioned presently. However, with continued reference to the longituidnal mode of vibration, the bushing is inserted into its tight-fitting bore with comparative ease.

The end-wise or longitudinal hydraulic pressure and the longitudinal mode of vibration, may be obtained by causing a hydraulic ram to bear at two nodal points of a steel bar arranged transversely thereto, and in which a lateral standing wave is set up by use of one or more of my sonic oscillators. The laterally vibrating mid-point of the bar, or some region adjacent thereto chosen for best impedance matching, or desired vibration amplitude, is then caused to bear on the bushing, and to apply its vibrations thereto; and by extending the hydraulic ram, the vibrating bar and the vibrating bushing are forced into the bore in the casting.

A special feature and accomplishment of this sonic fitting process is that final positioning or seating of the two parts relative to one another is improved. A feature of the process is to continue the application of sonic energy continuously while the parts are moving together, so as to avoid premature irrevocable sticking at some intermediate position with continued application of sonic energy for a time following attainment of this final position in order to assure good final seating.

One practice of the invention involves the application of sonic energy at such a level of vibrational amplitude as to cause the accompanying cyclic change of dimensions of one or both of the parts in a sufficient amount so that normally interference-fitting parts are cyclically looser fitting, and thus more easily pressed together. Accordingly, it is an object of the invention to apply a burst of high-level sonic energy to the slide zone to accomplish such a result.

According to one advantageous practice of the invention, I reduce the static friction between two or more mating parts by causing them to undergo elastic vibration at different amplitudes and/or phase by arranging for the mating parts to have different impedances.

This condition may be attained by having the parts of different physical dimensions or geometry, or of different materials. It is also a feature to cause different relative amplitudes of sonic or elastic vibration of the mating parts by applying the sonic or elastic vibrational energy at such a location and in such a frequency range that differential vibration amplitudes are brought about and/or accentuated.

According to another aspect or practice of this invention, I attain a differential vibration of the mating parts by taking advantage of differential attenuations brought about by causing the sonic energy to travel a longer or more attenuated path to one of the mating parts than to the other. One specific practice of the invention involves bringing about this performance by transmitting the sonic energy to one of the parts through the other of the parts.

Referring more particularly to the aforementioned practice of the invention involving the use of the ram of a hydraulic press, it is a feature of the invention to introduce the sonic or elastic vibration energy between the ram of the press and the part being pressed thereby.

One very beneficial practice of the invention involves introducing the sonic energy at such a point or region, and at such a frequency, that the two parts exhibit a difference in mode and velocity of sonic energy transmission. For example, one part can have a predominantly dilational mode of sonic energy transmission while the adjoining part will have a primarily lateral type of sonic wave action or vibration, or a predominantly longitudinal type of sonic wave action or vibration. The different velocities of propagation of different modes, resulting in relative vibration of the parts, so as to reduce sliding friction, is a feature of the invention.

Stated differently, it is an object and a feature of this invention to reduce the force required to slide interfering parts into engagement by engendering out-of-phase sonic elastic vibrations of adjacent parts.

A variation of the process within the scope of the invention is to sonically excite the mating parts with the same type of wave pattern, but to have the wave pattern of a type where the velocity of elastic vibration transmission is a function of the actual physical dimensions of the parts. Lateral waves and circumferential waves are examples suitable to this practice of the invention.

It should be emphasized that by use of the expression "sonic elastic vibration" I do not limit myself to wave transmission, since the invention may be practiced in certain forms using substantially lumped constant systems. The velocity relationship for wave transmission systems is given by the formula $c = f\lambda$, in which $c$ = velocity of said transmission, $f$ = frequency of the cycles, and $\lambda$ is equivalent wavelength, depending upon the structural element.

One very important form of my invention utilizes the sonic phenomenon of resonance, or selective frequency response, whereby the sliding friction of the parts is reduced by a particular kind of relative differential or out-of-phase vibration. This can be engendered in either one, or both, of the parts.

It is also an object and a feature of this invention to engender a frequency pattern with a frequency component causing selective and particularly active vibration of one of the parts.

It is a still further object and feature of this invention to engender a frequency pattern with a frequency component which causes a more inductive response of one part, and a more capacitative response of the other of said parts, whereby out-of-phase relative vibration results at the interface, so that sliding friction is reduced.

The invention will be fully understood from the following detailed specification, wherein reference is had to the accompanying drawings, in which:

FIGS. 1 and 2, taken together, show, partly in elevation and partly in longitudinal section, a form of the invention adapted for taking cores of earth material within an earth bore;

FIG. 3 is a longitudinal section taken in accordance with section line 3—3 of FIGS. 1 and 2;

FIG. 4 is a section taken on line 4—4 of FIG. 2;

FIG. 5 is a section taken on line 5—5 of FIG. 4;

FIG. 6 shows a longitudinal half-wavelength standing wave diagram or pattern such as is developed in the core tube of FIG. 2;

FIG. 7 is a broken vertical section, taken generally along the broken line 7—7 on FIG. 9, showing a presently preferred illustrated embodiment of the invention, and including a lateral one-wavelength standing wave diagram;

FIG. 7a is a section taken along the line 7a—7a of FIG. 7;

FIG. 8 is a horizontal section taken on line 8—8 of FIG. 7;

FIG. 9 is a section taken generally along the line 9—9 of FIG. 7;

FIG. 9a is a section taken along line 9a—9a of FIG. 9;

FIG. 10 shows a fragmentary end portion of a sonic vibratory bar, taken from FIG. 7, to an enlarged scale, with parts broken away;

FIG. 10a shows a fragmentary middle portion of the sonic bar, taken from FIG. 7, and shown at an enlarged scale, showing also the adapter, and work parts after driving together; and FIG. 11 is a transverse section taken on line 11—11 of FIG. 10.

FIGS. 1–5 shows a form of the invention for driving elongated members in tight lateral engagement slidingly along one another. Here the sonic elastic vibration is applied by firmly coupling the oscillator and the intervening structure in push-pull relationship to the member being driven. A typical mode of the elastic vibration is a longitudinal standing wave pattern in the driven member. It is preferably of half-wavelength, as represented at $st$ in the conventional diagrams of FIG. 6. This is a fairly high impedance mode because $pc$, the acoustic impedance, is a maximum. It is thus especially good for driving long shafts in tight engagement over long dimensional intervals, where a high impedance wave pattern is inclined to be more powerful and less damped out. In addition, the longitudinal mode gives a sort of Poisson's ratio effect whereby the circumferential dimension, particularly in certain nodal regions, changes in synchronism with the changes in longitudinal dimension.

The particular illustrative application that will be here dealt with is the driving of a core tube into tight-fitting earth structure, usually rock, within a deep well in the earth. It will be evident how the same techniques may be used for driving a long shaft, for example, inside of a bore in a body, a sleeve, or the like, where the fit is tight.

FIGS. 1 and 2 taken together show a string of components adapted to be lowered in a bore in the earth on a flexible cable 43, which is to be understood as including a central electrical conductor for supplying electric power to an electric drive motor unit 44. This motor unit 44 may be any suitable submersible electric motor, the details of which need not herein be set forth.

At the lower end of the string of components shown in FIGS. 1 and 2 is a long, thin-walled extrusion tube or barrel 45 typically of one-eighth-inch wall thickness, five-inch outside diameter, and sixty feet in length. This tube 45 has at the top an internally threaded coupling pin 47 on the lower end of a sub 48, which is in turn coupled to the lower end of sonic wave generator or oscillator unit 49. The generator unit 49 may be designed to produce longitudinal, torsional, or transverse modes of vibration, such as by selecting the desired phasing of plural vibrating weights in the generator, and transmit these modes to and along the core tube 45. I have here chosen to illustrate a case wherein the longitudinal mode of sound wave action is employed, and the details of an illustrative sound wave generator or oscillator of this type will be presently described.

The upper end of generator 49 is attached to the lower end of a resonant oscillatory energy storage device 50, the upper end of which is in turn secured to and suspended from the lower end of the submersible motor 44. Without going into detailed explanation at this point in the specification, the purpose of the device 50 is to provide the apparatus with a resonant acoustic "circuit" of high Q, by which the vibratory apparatus is stabilized and operates at high efficiency and effectiveness. The factor Q will be understood to be a figure of merit in oscillatory systems, denoting the ratio of energy stored in the system to energy expended per half cycle of operation. The Q factor is somewhat akin to flywheel effect, and assures stabilized, powerful operation. Such a device avoids wastage of force owing to vibratory masses in the vibration generator, and brings the full potential power of the generator to bear on the work to be done. It will be described in more particular hereinafter.

In the particular configuration of apparatus in the embodiment under consideration, the vibration generator 49 is driven from the submersible motor 44 through a long shaft running through the oscillatory device 50. The generator 49 has an operating frequency in the range of the resonant frequency of the device 50, and thus sets the latter into resonant vibration. The generator 49 thereby vibrates at substantial amplitude, and this vibration is transmitted to the core-taking tube 45.

An example of a suitable vibration generator 49 is shown in FIGS. 4 and 5 and will next be described in detail.

The vibration generator 49 has a hollow housing 60, which is longitudinally split into two halves, and bolted together as at 61. At the upper end, it is connected to the lower end of unit 50, as by high-strength screw fastening means indicated at 62 in FIG. 2. At the lower end, the housing is secured to the upper end of sub 48, as by screw means indicated at 63 in FIG .5.

The generator housing 60 is closed at the bottom, as shown, and formed with an interior cavity conforming to and accommodating certain rotating parts and bearings as now to be described. Extending downwardly into housing 60 from its upper end is a bore 65 which receives certain bearings for vibrator drive shaft 66, the bearings being spaced by spacer sleeves, as indicated, and being retained by a threaded retainer 67, screwed into the upper end of bore 65. The head of retainer 67 is recessed into the lower end of unit 50, as shown. On the lower end of drive shaft 66 is a bevel gear 68 meshing with two bevel gears 69 integral with two spur gears 70 mounted for rotation in opposite directions on suitable bearings on a shaft 71 set into the vibrator housing. The gears 70 mesh with spur gears 72 integral with larger spur gears 73 set into the vibrator housing below shaft 71. The two gears 73 mesh with spur gears 75 on the peripheries of two unbalanced vibrator rotors 78 mounted side by side, for rotation in opposite directions, on a common shaft 79 set into the housing. The two rotors are spaced by means of a hardened steel watcher 80, as indicated. There are four such pairs of rotors 78, arranged vertically one above the other, with the gears 75 thereof in mesh from rotor to rotor. Lubrication of these parts is accomplished by introducing a few cubic centimeters of oil to the interior of the vibrator housing.

The eccentric weights 78a of all rotors of the vibrator are arranged to move vertically in unison. It will be seen that the two rotors of each pair turn in opposite directions, so that lateral components of vibration are counterbalanced. Vertical components of vibration of all rotors, however, are in phase and therefore additive. The rotors 78a, thus moving vertically in unison, deliver through their mounting shafts 79 and to the vibrator housing 60 a vertically directed alternating force of substantial magnitude. This alternating force is exerted on the lower end portion of the unit 50 immediately above, with the result that a longitudinal mode of elastic resonance is generated in units 50.

Turning attention now to the oscillatory device 50, and with reference more particularly to FIG. 3, the device comprises essentially an axially-bored cylindrical rod or bar 80, composed of a good elastic material, such as steel, formed at the top with a mounting flange 81 by which it is secured, through screws 82, to the lower end of the housing of motor 44, and a surrounding cylindrical housing member 83, composed of similar elastic material, connected at its upper end to the upper end portion of rod 80. For example, the upper end portion of the rod 80 may be formed with an annular flange or shoulder 84, which is abutted by a somewhat thickened upper end portion 85 of the housing 83, with the parts connected by means of machine screws 86, extending down through flange 84 and threaded into housing portion 85. A rigid, structurally-integrated connection is thus made between the upper end portions of the members 80 and 83. The housing member 83 has a lower end closure wall 87, recessed as hereinabove mentioned to receive retainer 67, and formed with an axial bore 88 to receive a presently described drive shaft and shaft housing.

The device 50 is of considerable length, illustratively, approximately twenty-six feet from its lower end to flange 84 near the top. The cross-sectional areas of hollow rod 80 and the surrounding cylindrical housing 83 are preferably made approximately equal. The members 80 and 83 are annularly spaced, as shown, and preferably, there is screw-coupled to the lower end of member 80 a mass loading sleeve 89, typically three feet in length, received in the annular space betwen members 80 and 83, with adequate clearance being provided between sleeve 89 and the housing 83. The purpose of this sleeve 89 can best be described later.

The oscillatory device 50 will be seen to be similar in certain respects to a tuning fork, the inner and outer members 80 and 83 constituting the legs thereof, and these legs being firmly joined at the top to form a common head structure. However, whereas the legs of the simple tuning fork bend transversely in their vibratory action, the legs of the present device alternately elastically elongate and contract in the longitudinal direction, these actions being of opposite phase in the two legs, so that dynamic balance is preserved. The head structure, where the two leg elements are joined, remains substantially stationary in this action, being at the node of a quarter-wave standing wave in the device. The effective lower ends of the two legs are the locations of antinodes of the standing wave. This vibratory action is obtained when the structure is excited at a vibration frequency for which the structure is resonant; and a tuned resonant structure is attained when the two legs 80 and 83, taking into account mass loading by both the generator and the sleeve 89, both are of an effective length substantially a quarter wavelength for the exciting frequency. As will readily be appreciated by those skilled in the acoustics art, the structure may be "tuned" in various ways, as by modifying the cross-sectional area of one or both of the legs, or by adding so-called "lumped" mass to one of the legs, e.g., the sleeve 89. It will be observed that the outside leg is longer than the inside leg 80, and also has certain lumped mass at its lower extremity, both by reason of the end wall 87, and by reason of the coupled-in mass from the generator 49. The outside leg accordingly tends to have substantially greater effective length in terms of quarter-wavelength distance than inside leg 80 when the latter is considered without the added sleeve 89. To tune the inner member 80 to the outer member 83, the sleeve 89 has been added to the lower end of the member 50, thereby adding substantial mass, and correspondingly lengthening the leg in terms of quarter-wavelength distance. By this means, two legs 80 and 83 are tuned to the same resonant vibration frequency. This subject will be dealt with at greater length hereinafter.

The electric drive motor 44 and its internal details may be conventional and hence require no illustration herein. This motor has a vertical drive shaft 90 (see FIG. 3) whose lower end is formed with a splined socket 91, and an extension shaft 92 has a splined head 93 meshing with the splines in socket 91, and is supported in bearings contained within a bearing retainer 95 set into a bore 96 formed in the upper end portion of member 80. Extending downwardly through member 80 along the longitudinal axis thereof, below the bore 96, is a slightly reduced bore 97. Shaft 92 has at its lower end a taper friction joint coupling 98 to the upper end of a tubular drive shaft 99 which extends downwardly through bore 97 and has at its lower end a driving coupling with the upper end of the drive shaft 66 for vibration generator 49 (see FIG. 5). As shown, there is fitted onto the lower end of tubular drive shaft 99 a coupling 100, which is formed at the bottom with an internally splined socket 101 receiving the reduced splined upper end portion 102 of drive shaft 66. In operation, as will subsequently appear, the housing of generator 49, and therefore also the drive shaft 66 for the generator, oscillate vertically through a certain displacement distance, and the splined connection between oscillator drive shaft 66 and the tubular drive shaft 99 accommodates this relative motion.

Bearing retainer 95 (FIG. 3) includes a reduced portion 105 projecting a short distance down into bore 97, and connected thereto and extending throughout the length of member 80 is a shaft housing tube 106. Bearings 107 in this housing tube 106 serve to journal the tubular drive shaft 99, and are spaced by spacer sleeves 108. Clearance is provided between housing tube 106 and the inner wall surface of the bore 97 in rod 80 in order to guard against rubbing contact therebetween during vibratory action of member 80.

The core barrel or tube 45 has a length related to the effective lengths of the legs 80 and 83 of the oscillatory device 50, and in this case, may be approximately sixty feet in length, which is a half-wavelength distance for an operating frequency of about 133 c.p.s. In the present design, the length of member 50, from the lower end of housing 83 to flange 84, may be 26.6 feet. Taking into account the previously described lumped masses effectively added to both inner leg 80 and outer leg 83, the effective length of each leg, in terms of wavelengths, is one-quarter wavelength for the predetermined operating frequency of 133 c.p.s. In other words, the effective length of device 50 is half the length of the core tube 45. With the system operating at an operating frequency of approximately 133 c.p.s. the housing of vibration generator 49 oscillates vertically through a material displacement distance at that operating frequency, and sends corresponding elastic deformation waves down to the core tube 45. In view of the fact that the core tube is a half-wavelength for the operating frequency, a half-wavelength standing wave *st* is set up in the core tube, with a velocity antinode at the top, a velocity antinode at the bottom, and a node at the mid-point (FIG. 6). Thus the mid-point of the tube stands substantially stationary, vertically, having only a dilational vibration caused by the longitudinal mode, whereas the upper end portion oscillates vertically in correspondence with the oscillatory driving action of the generator housing, and the lower edge of the tube oscillates vertically against the earthen formation F from which the core C is extruded, radiating sound waves into the earth material immediately below the annular lower edge of the tube.

The over-all operation of the system is as follows: Assuming, for example, that a bore has been drilled into the earth to a certain depth, and that a core is to be taken for a number of feet below that depth, the drilling apparatus is removed from the bore hole and apparatus shown in FIGS. 4 and 5 lowered therein on suspension cable 43 until the lower end of the core tube 45 is in pressural engagement with the bottom end of the drill hole. Electric power is then conveyed via an electrical conductor in suspension cable 43 to drive motor 44, which drives shaft 99, extending downwardly through the oscillatory device 50, and in turn the drive shaft 66 for vibration generator 49. It is necessary, as mentioned earlier, that the operating frequency be a resonant frequency for the oscillatory device 50 and the core tube 45. A.C. electric power of the proper frequency for the correct drive of electric motor 44 may be obtained from a generator driven by a variable speed internal combustion engine.

Accordingly, generator 49 delivers an alternating force in a vertical direction at the predetermined resonant operating frequency of the system. This alternating force is exerted on the lower end of the outer tubular leg 83 of the oscillatory device 50, sending elastic deformation waves of alternating elongation and contraction up said leg. By virtue of force interactions occurring in the region of juncture of the outside tubular leg 83 with the inside cylindrical leg 80, corresponding longitudinal elastic deformation waves of like nature but of opposite phase occur in the latter. These waves in the members 80 and 83, being at the resonant frequency of the structure, the amplitude of the elastic deformations occurring therein becomes magnified, and a running condition is quickly attained at which the two legs 80 and 83 each undergo alternate longitudinal elastic elongations and contractions, of opposite phase with respect to one another. Dynamic balance longitudinally of the device is thereby gained. In such operation, the oscillatory device 50 functions as an energy reservoir of high Q, stabilizing the entire system at high vibration amplitude. In this action, the two legs of the device alternately store and supply energy to the system, as will readily be appreciated by those skilled in the art.

Confining attention for a moment to the alternating vibration or force generator 49, it may be appreciated that the vertical oscillatory motion undergone by the housing and other mass components of the generator represents a potential serious wastage of the alternating force generated therein. An important function of the oscillatory device 50 is to "tune out" the oscillatory mass of the generator housing and thereby conserve this otherwise waste force. This mass, being coupled directly to the lower end of the leg 83 of the oscillatory device 50, becomes in effect a lumped mass added to the lower end of that vibrating leg, as mentioned earlier. This mass thus becomes a part of the vibratory system 80, 83, and is balanced by the elastic compliance inherent in the members 80 and 83. The effect of the coupled-in mass of the generator is to lower the resonant frequency of the device 80, 83. The added mass also, when added to the outer leg 83, overweights the latter as compared with the inner leg 80, and to restore balance, the sleeve 89 connected to the lower end of the inner leg 80 is made of the necessary counterbalancing mass. Without such mass thus added to the inner leg 80, the addition of the mass of the generator 49 to the outside leg 83 results in the desired node at the upper end junction of legs 80 and 83 becoming shifted downward within the outside leg 83, so that the substantially stationary point of the vibratory system, i.e., the node, is located within the leg 83, some distance down from the upper end thereof, whereas the junction region is no longer at a node and undergoes some degree of vibration. The added mass 89 is thus made of such value as to preserve the location of the node in the junction region of the members 80 and 83.

Such conditions having been attained, the lower end of the vibration or force generator 49 oscillates vertically at substantial amplitude and exerts an alternating force of substantial magnitude on the upper end of the core tube 45. This force application to the core tube sets up a half-wavelength standing wave therein, as heretofore described, causing the lower edge of the core tube, which is being held under a certain degree of pressural engagement against the bottom of the earth bore, to oscillate against the earthen material.

As heretofore described, the action of the oscillating lower edge of the core tube against the earth is to locally increase the fluidity of the earthen material immediately adjacent thereto, causing a core of earth to be separated from the surrounding earth structure and to flow or extrude readily up inside the core tube as the core tube descends. It will be appreciated that the equipment is rested, at least partially, on the hole bottom, so that downward biasing pressure is exerted by the core tube on the earthen material; and also that the equipment is gradually lowered as the core taking operation proceeds. The longitudinally vibrating core tube acts not only on the earth material immediately under its lower edge, but also by shear coupling on the core which has extruded up into the tube so as to sonically activate the surface portion of the core, thereby renducing friction between the core and the tubing and thus facilitating movement of the core up the tube. It will be seen that back resistance of the core is thereby relieved or materially reduced, which again facilitates movement of the core into the tube at the point of entrance.

As mentioned at the outset, with suitable modifications of equipment, the same sonic techniques as applied in the foregoing may be utilized in driving a sleeve longitudinally into a shaft where there is a tight fit, or, of course, which is the same thing, any shaft into a tight-fit bore intended to receive it.

Referring now to FIGS. 7–11, a hydraulic press-type machine, incorporating the sonic vibration principles of the invention, is shown in a typical form, and as an illustrative application, there is shown the case of pressing a bushing in a bore in a housing or frame member, typically a casting. A hydraulic press frame is designated generally at 120, and is shown to comprise a pair of vertical legs or columns 121 rising from a suitable base B and having at the top an arch 122 extending therebetween (FIG. 7). The arch 122 is joined medially by a cross-arch 123 rising and extending between two frame portions 124 and 125 erected from base B.

A hydraulic ram 126 projects downwardly through a boss 127 on the underside of the head formed by the crossed arches 122 and 123, and will be understood to be provided with a suitable hydraulic cylinder (not shown) within the arch 122, which may be afforded at the top with an extension 122a to accommodate the necessary vertical length of such cylinder, and with conventional hydraulic arrangements by which the ram 126 can be extended under controlled hydraulic pressure, and subsequently retracted, these parts being omitted from the drawings for simplicity in view of their conventional nature.

At the bottom on base B, the press 120 has a horizontal platen 130, and there is shown resting thereon, for typical example, a conventionally illustrated generally cylindrical casting or other machine part 131 having a top wall 132 which is formed with a downwardly projecting annular flange or boss 133 defining a cylindrical bore 134. Into this bore 134 is to be pressed a bushing 135, which is comprised of a cylindrical wall 136 with a flange 137 at the upper end, the outside diameter of the cylindrical wall 136 being understood to be such, relative to the inside diameter of bore 134, as to assure a tight press-fit, generally speaking, either an interference fit, or a fit so tight that the bushing is difficult of insertion even under application of considerable pressure.

Disposed in the space between columns 121, and located over the bushing 135, is a horizontal elastically vibratory, "sonic" beam 140, composed of a good elastic material such as steel, and of dimensions in both length and cross-section of the typical order illustrated in the drawings in relation to the dimensional order of the bushing. This beam is set into a mode of elastic lateral standing wave vibration in a vertical plane, as presently to be described, and the vibration from this beam is transmitted to the upper side of the bushing by means of an adapter 141. The adapter 141 in this instance may comprise a steel disk adapted to engage the flange 137 of bushing 135 at its bottom face, and which is formed at opposite ends of a diameter thereof with upwardly projecting pairs of ears 142 which receive between them the vibratory bar or beam 140. to which they are connected by pins 143. As here shown, the pins 143 engage the beam 140 at selected points approximately one-quarter of the distance from the mid-point of the beam to its extremities. The adapter may be pinned selectively to the beam at different locations therealong, or to its mid-point, to give different performances, as will appear. For some purposes, pin positions spaced from but relatively close to the later described nodal points in the beam are advantageous, as where high-force application with low amplitude of vibration is particularly desired.

The vibration set up in the sonic beam 140 is in the nature of a lateral resonant standing wave, such as diagrammed at w at the top of FIG. 7. In this diagram, the vertical dimension a taken at different positions along the wave pattern shown represents the amplitude of vibration at corresponding points of the beam 140. Thus, the beam vibrates with minimized amplitude at the two nodal points N, and vibrates at large amplitude at the antinodal regions V at the two ends as well as at the antinodal region V' at the center. As will be seen, the adapter 141 has been connected to the bar 140 at two symmetrically located points of the standing wave, where the wave or vibration amplitude in the bar is material, but not as great as at the lower impedance antinode at the center of the bar. Such location has been found to be advantageous, but for other cases, other points of connection with other amplitudes of vibration and impedances may be chosen.

The described lateral standing wave may be set up in the beam 140 by various means, but simple and presently preferred mechanical oscillators for so doing will be described presently.

The nodal points N are at approximately one-quarter of the length of the beam inward from each of the two ends of the beam, and these are desirable points for mounting the beam and supporting it during its standing wave vibration. To accomplish such mounting, I locate nodal support pins 145 transversely through the beam at the two nodal points, and these are supported by pairs of ears 146 straddling the bar 140 and depending from opposite extremities of a laterally disposed support beam 148 located immediately over the vibratory beam 140. The beam 148 also has the function of substantially isolating the vibration in the beam 140 from the frame of the machine, in view of the nodal point location of the support pins 145. The beam 148 is supported from its opposite ends by means of vertical pins 149 threaded therein and extending upwardly through vertical bores 150 in brackets 151 secured to the frame columns 121. The pins 149 fit the bracket bores for free-sliding vertical movement, and have heads 152 on their upper extremities, with coil compression springs 153 encircling them between said heads 152 and the upper ends of the brackets 151. To permit good length for the pins 149 and springs 153, pockets or wells 154 for the upper end portions thereof may be formed in the underside of arch 122. Springs 153 are heavy and stiff enough to support the beam 148 and the vibratory beam 140 in the uppermost position of FIG. 7, with beam 148 in engagement with the undersides of the brackets 151, until the beam 148 is moved downwardly by action of the hydraulic ram 126. Beam 148 will be seen to have in its upper side a seat 165 for the ram 126, and the ram 126 is adapted to move downwardly into said seat 165, and then to move the beam 148, the vibratory beam 140, and the adapter 141 downwardly against the bushing 135, so as to force the latter into the bore 134 in member 131. It will be understood that the ram 126 is provided with a sufficient stroke to move the parts down a sufficient distance to force the bushing 135 progressively into position in the bore 134.

The means for setting up the lateral standing wave vibration pattern w in the sonic beam 140 comprise, in the example here given, simple air-driven oscillators 158 located one at each end of the beam 140. With particular reference to FIGS. 10 and 11, and confining attention to the oscillator at one extremity of the beam 140, the beam extremity is hollowed out from the end, as indicated at 159, and a horizontal transverse sleeve 160 is mounted in the beam end across this hollow or cavity 159. This sleeve 160, which is thus parallel to the nodal pins 145, is set tightly into the beam wall 161 at one side of the cavity 159, and is screwed into the beam wall 162 on the opposite side, as clearly indicated in FIG. 11. One end of the sleeve 160 is closed, as illustrated, and the other is threaded to receive an air intake pipe 164. Surrounding the sleeve 160 is an inertia ring 165, having an inside diameter somewhat larger than the outer diameter of the sleeve 160, and of approximately the proportions shown in FIG. 11. The sleeve 160 is provided with tangentially oriented air discharge jets 166 extending from its interior bore to its exterior periphery. Air under pressure delivered via intake pipe 164 and entering the bore of sleeve 160 is ejected with tangential components of direction toward the inertia ring 165, driving the ring so as to spin or whirl on the sleeve 160, in the direction of the arrow, as indicated in FIG. 10. To confine the ring 165 laterally on the sleeve 160, so as to remain in proper relationship to the air jets, and to guide it against lateral displacement or wobble, the sleeve 160 is formed with peripheral beads 168 positioned closely adjacent opposite edges of the ring 165 when the ring is properly axially positioned on the sleeve 170, in proper alignment with the tangential air discharge jets. The ring 165 is designed and positioned so that when swinging towards the inside end of cavity 159, it will clear the inner wall thereof, as clearly appears in FIG. 11. It will be evident that the inertia ring exerts a gyratory force on the sleeve 160, with the resulting rotating force vector turning about the axis of the sleeve 160, and being applied through said sleeve to the extremity of the beam. It will further be evident that thereby there is exerted on each extremity of the sonic beam a rotating force vector with one force component thereof oriented longitudinally of the beam and the other oriented to be vertical, and transversely of the beam. The tangential air jets 116 in the oscillator sleeves 160 at opposite ends of the beam are oppositely directed relative to one another, so that the inertia rings 165 at the two extremities of the beam whirl in opposite directions, as indicated by the arrows in FIG. 7. The advantage thereof will be explained hereinafter.

The development of the lateral standing wave $w$ may be understood from a consideration of the oscillator 158 at a single end of the beam. The air pressure to this oscillator is regulated, by any suitable means not here shown, so that the inertia ring 165 whirls on sleeve 160 at a frequency in the range of the resonant frequency of the elastic beam 140 for a lateral mode of standing wave vibration, preferably at the mode setting up a lateral standing wave of one wavelength, as diagrammed at $w$ in FIG. 7. This standing wave is characterized by nodes N at approximately quarter-wavelength distances in from each end of the beam, antinodes V at the ends, and an antinode V' at the mid-point, as explained earlier. It will be understood from principles familiar in the science of acoustics that such a standing wave results from transmission or propagation along the beam 140 from an oscillator at one end thereof of successive waves of transversely oriented elastic deformation vibrations, which waves are reflected from the far end of the beam, and through interference with succeeding forwardly propagated waves, establish a lateral standing wave with nodes and antinodes as represented. The free extremity of the beam, where an antinode can be developed, is a good point, of proper impedance, for approximate location of an oscillator 158. The quarter-wavelength points, which are points of very high impedance, with minimized vibration, are appropriate points for mounting of the beam.

When the oscillator 158 is air driven so as to operate in the region of resonance for the lateral wave described, the ring tends to lock in on the low side of peak resonance, and a stable system is obtained. For further teaching of this phenomenon please note my Patent No. 2,960,314.

When two vibration generators or oscillators 158 are used, one at each end of the beam, they synchronize with one another automatically. Each, when operating at the resonant frequency of the beam for lateral standing wave vibration, tends to set up a resonant lateral standing wave. These waves automatically phase with one another, and result in synchronizing the two inertia rings. Thus, the rings move vertically in unison with one another, which is what is required for joint development of a resultant lateral standing wave which is double the strength of the wave that would be generated by a single ring. Turning in the same spin directions, the synchronized rings move longitudinally in opposition to one another, and their force applications to the beam thus cancel in the longitudinal direction. In any event, the force impulses from the ring do not coincide with a longitudinal resonant frequency of the beam, and no tendency for longitudinal vibration of significant amplitude is present in any event.

It will be seen that the described lateral standing wave in the beam 140 involves vertical vibratory movements of the portion of the beam between nodes N with amplitudes which are proportional at every point to the dimension $a$, which is zero at the nodes, and increases to a maximum at the antinode V'. As earlier explained, the beam 140 is selectively coupled to the adapter 141 which is to operate on the work piece 135 at a point or points where the impedance, and therefore the cyclic force and vibration amplitude, is appropriate for the work in hand. For the instant example, two coupling points have been chosen, each approximately half way from the center antinode V' to the nodes N outside thereof, these being points of relatively high impedance, without too much amplitude or "wildness." As a typical example for a beam 140 approximately 24 inches in length, the vibration amplitude at the adapter coupling pins 143 may be of the order of approximately .030 inch. The sonic beam 140 will be seen to constitute the high Q energy storage device mentioned in the introductory part of the specification. In this case, it serves also as the body of the oscillator. The beam 140 is designed with enough elastic stiffness reactance to counteract the mass reactance of the system at the operating frequency.

The press 120 is also provided with a clamping means for the casting or other member 131 into which a part such as the bushing 135 is to be inserted, and preferably incorporated therewith is another sonic vibratory beam system which can be used either along with, or as an alternative for, the vibratory beam 140.

As here illustratively shown, one side of the upper end portion of the casting 131 is engaged by an adjustable pad 180, mounted by means of a ball joint at 181 on the end of a screw threaded shaft 182 which passes through an internally threaded nut member 183 fixed in the frame member 124. A handle 184 on the extremity of shaft 182 permits it to be advanced to set the pad 180 tightly against the casting 131.

Diametrically opposite from the pad 180, the casting 131 is engaged by an adapter 185, generally like the adapter 141, excepting that its clamping face is formed with a concavity 186 to fit the member 131, and that in this case there is shown an arrangement wherein the adapter is connected to the center point of a vibratory or sonic beam. This beam, deisgnated at 188, is vertically disposed, and may be exactly like the aforementioned sonic beam 140.

The beam 188 is provided with mounting and hydraulic ram components similar to those described for the beam 140, as will be further described presently.

The adapter 185 may suport the beam at two points spaced from its mid-point, but inward of its nodal points, as in the case of adapter 141 and beam 140, but in this instance is connected to the beam at the mid-point of the beam by means of two ears 190 formed on the adapter and straddling the beam, and a connecting pin 191. This pin 191 will be seen to connect the adapter to a velocity antinode region of the beam so as to afford maximum vibration amplitude. This center-point (or velocity antinode) type of connection between the beam 188 and the adapter 185 may also be used between the beam 140 and the adapter 141, and is useful in cases where large amplitude vibrations are desired or can be tolerated. The two-point type of connection can be used advantageously between either beam 140 and adapter 141, or between beam 188 and adapter 185, in all cases where vibrations of lower amplitude but higher cyclic force are of advantage, and connections are for such reason desired at the higher impedance regions nearer to the nodal points.

The beam 188, as in the case of the beam 140, has nodal points at approximately one-quarter of its length inward from each of its two ends, and the beam is mounted at these points, similarly to the arrangements for the beam 140, on nodal support pins 195 carried by pairs of ears 196 extending from opposite extremities of a vertically disposed support and vibration isolator beam 197. The latter is on the ends of pins 198 extending through brackets 199 and 200, supported as presently to be mentioned, the pins 198 having heads 201, and there being coil compression springs 202 confined between said heads and the brackets 199 and 200. As will be seen, the frame part 125 is formed to afford a horizontal recess defined by a horizontal downwardly facing wall face 204, and the upper face of frame base B. The bracket 199 is secured to the frame face 204, and the bracket 200 to base B.

A hydraulic ram 210 projects horizontally from a boss 211 extending from frame part 125 on a horizontal axis which intersects the mid point of the sonic beam 188, and it will be understood that this hydraulic ram has, within boss 211 and the frame part 125, a suitable hydraulic cylinder (not shown) and also necessary conventional hydraulic arrangements by which said ram 210 can be extended under controlled hydraulic pressure, and subsequently retracted, these parts being omitted from the drawings for simplicity in view of their conventional character. The support beam 197 will be seen to have a seat 213 for the ram 210, and the ram 210 is adapted to move into engagement with said seat, and then to move the support beam 197, the sonic beam 188, and the adapter 185 into clamping engagement with the member 131.

The arrangements thus described will accordingly be seen to comprise a hydraulic clamp by means of which the member 131 into which the bushing 135 is to be forced may be very tightly held during the vibratory and forcing action applied to the bushing when sonic beam 140 is forced downwardly and maintained in vibration.

The sonic beam 188 also, however, is afforded with sonic vibration generators or oscillators 220 at one or both of its extremities, and these oscillators, which may be exactly like the oscillators 158 heretofore described in association with the sonic beam 140, may operationally be operated at the resonant frequency of the sonic bar 188 for its lateral mode of standing wave vibration, with the consequence that the casting or other member 131 is sonically vibrated while the bushing 135 is being pushed downwardly and also subjected to vibration. The pressing of the bushing 135 into place in the member 131 is thereby further facilitated.

It is also to be understood, however, that the press as thus described is also adapted for forcing a member into position in a horizontal direction. Thus, using only the clamping member 180, the clamping adapter 185, and the sonic bar 188, two parts can be forced together with the use of these components in the horizontal direction by progressive extension of the hydraulic ram 210 while the sonic bar 188 is driven in its standing wave mode.

The invention will now be further described, assuming first the case illustrated in FIGS. 7–11, with the adapter set up against the member 131 under pressure exerted by ram 210, but without vibrating the bar 188. The oscillators 158 are driven so as to establish the lateral standing wave in the sonic beam 140, and the hydraulic ram is extended so as to seat and exert pressure against beam 148, the adapter 141 suspended from the beam 140 being understood to be in engagement with the top of the bushing 137, which is positioned over the bore 134 in member 131, in accurate alignment therewith. Ordinarily, the adapter 141 would initially clear the work piece somewhat and only engage it after a certain extension of ram 126 to lower the beams 148 and 140 and the adapter 141. In any event, the ram is lowered until the adapter 141 hung from the sonic beam is in firm and pressural engagement with the part 131 into which it is to be pressed, and is then moved on down the full distance necessary to force the bushing 135 home in the bore 134. The cyclic pressure on the bushing, received from the sonic beam lowering under the force applied by the ram, results in easy insertion into the bore 134, notwithstanding the tight frictional or interference fit of the bushing in said bore. In some cases of large-interference fit, the parts can be easily pressed together by the process of the invention, i.e., using cyclic pressure, where steady pressure would fail to accomplish the job.

To more perfectly understand the invention, sonic vibratory performance must be more closely examined. There are many sonic phenomena that play a part in the practice of the invention, and while these may vary with different applications of the broad invention, the example illustrated in FIGS. 7–11 will be considered. The bushing 135, and the casting or other part 131 which is to receive the bushing 135, are complex structures of a distributed constant type. That is to say, mass is distributed throughout their structures, and the walls thereof have inherent elastic stiffness. These entire structures thus can elastically vibrate, and can do so in or out of resonance. In general there may be a number of resonant frequencies, and a number of resonant standing wave patterns, depending upon where and at what frequency a cyclic driving force is applied. In the case here assumed, the cyclic force is received by the casting part 131 from the bushing 135 being forced into it under cyclic force which is being applied to the bushing. The bushing itself is being cyclically vibrated in a vertical direction from the adapter 141, and may be undergoing sonic elastic vibration. The adapter, in turn, is being cyclically vibrated vertically by the sonic beam 140. As mentioned hereinabove, the adapter is coupled to the sonic beam at a selected impedance point or points of the beam, and in view of the sonic vibration thereby transmitted from the sonic beam through the adapter and work piece engaged thereby, this is an acoustic or sonic vibration coupling, whereby elastic vibrations of the beam are transmitted through the adapter to the work. This constitutes a flow of the sonic energy from the sonic oscillators 158 to the sonic beam 140, and thence via the adapter 141 to the work comprised of the bushing 135 and the member 131, and to the interface therebetween. If the adapter is fairly stiff, it presents to the upper end of the bushing an output impedance of the same order as that of the sonic beam at the coupling points to the adapter, and its output vibration is primarily vertical, so that longitudinal vibrations are applied to the upper end of the bushing, at fairly high impedance. The bushing 135 also has impedance characteristics of the same order. Sonic vibrations thus coupled into the bushing travel primarily longitudinally through the bushing, causing it to periodically elastically elongate and retract, as represented by the dot-dash line 135a in FIG. 10. Dilational modes of vibration, however, are easily set up in the bushing, particularly if the adapter is subject to transverse elastic bending, and in general, the bushing may be stated to be prone to both longitudinal and dilational modes of elastic vibration. By proper correlation of the sonic vibration frequency of the system with the dimensions and geometry of the bushing (or other article to be fitted) the vibratory modes in the bushing, or the like, can be at resonance, and therefore amplified, and to do this constitutes one practice of the invention. This sonic vibratory action within the bushing induces both longitudinal and rocking (lateral) modes in the cylindrical boss 133 of the member 131, as represented with some exaggeration in dot-dash outline at 131a in FIG. 10. Lateral elastic bending can also take place in the top, and other walls of the member 131, all contributing to minute but effective cyclic dimensional variations in the bore 134 into which the bushing is being inserted. The vibratory modes in the member 131 can similarly be at resonance, with improved vibration amplitude. The longitudinal vibrations in the bushing also contribute a Poisson's ratio type of effect, whereby the bushing cyclically contracts, and thus cyclically has a looser fit in the bore 134. Also, the dilational vibrations in the boss 133 will in general not be of the same amplitude as those in the bushing, as well as being, in general, out of phase therewith, whereby cyclic looseness between the bushing and the bore is promoted, It should be noted that, particularly at the initial starting of the bushing into the bore 134 in the boss 133, FIG. 7, there is a discontinuity in sonic wave path and a large mismatch of impedance at the lower end of the bushing, with the consequence that a large part of the sonic wave reaching the lower end of the bushing is reflected back up the bushing. Under these beginning conditions, there is a large vibratory motion of the lower end of the bushing relative to the part 131. Such relative vibratory motion is of course conducive to entry of the bushing into the bore in the part 131 as the bushing is pressed down by reason by breaking static friction. When the bushing has been inserted a short distance into the bore 134 in part 131, there are two additional mismatches of impedance, again with large reflections of energy back up the bushing. The first of these arises from the fact that the lower extremity of the bushing is then being frictionally gripped in the bore in the member 131, whereas the portion of the bushing immediately thereabove remains free for elastic vibration or wave motion. The second of these arises at the meeting interface between the lower already-entered portion of the bushing and the surrounding wall surface of the member 131. These restraints to freedom of vibration of the lower, entered portion of the bushing thus constitute impedance mismatches, and result in reflections of wave energy, accompanied by a sharply increased relative vibratory movement between the bushing and the member 131. These aids to relative movement of the parts, and consequent reduction of friction, are highly important to movement of the bushing on down into its bore in the member 131.

It will be apparent that the phenomena described immediately above involves a mismatch of impedance at the slide zone, resulting reflection of sonic energy, and, therefore, greater vibration amplitude of the bushing than is imparted to the part 131 into which the bushing is to be installed.

Desirable relative motion between the bushing 135 and the member 131 can also be brought about in other ways, as by providing for phase differences in vibratory motion of these parts. For example, the elastically vibratory system comprised of the sonic beam, adapter and bushing 135 has a resonance frequency governed essentially by the parameters of mass and elasticity for the sonic beam. The member 131 can easily be made to have a resonant frequency which departs very considerably from that of the sonic beam. At the operating frequency of the system, which is substantially the resonant frequency of the sonic beam, the member 131 will accordingly have a phase angle which differs very materially from that of the beam. Vibrations imparted to the member 131 will accordingly tend to be at this phase angle relative to the vibration of the sonic beam and the bushing. Large relative motion between bushing 135 and member 131 can thus be induced.

Relative motion between the bushing and the member 131 also results from sonic wave attenuation. The source of the vibration is in the sonic beam 140, and this vibration is attenuated gradually along the transmission path, with a large attenuation at the juncture between the bushing and the member 131.

Difference in impedance, and increased relative motion, is also increased if different materials, of different acoustic impedance, are chosen for the bushing and casting, for example, bronze and steel.

Consider now that the operation is as above described, but that the sonic beam 188 is also energized, so as to apply a lateral vibratory force to the member 131. By this means, an elliptical mode of elastic vibration can be set up in the member 131, and a case is thus presented in which one type of vibrational mode is set up in one of the mating parts, and an entirely different vibrational mode is set up in the other. The velocities of propagation of these different modes of vibration will differ. Large relative cyclic movements, and resulting reduction in friction, are thus obtained. Also obtained thereby are out-of-phase relationships of the vibrations in the two parts. The system thus operated also presents the broad case of one of the mating parts being vibrated from one source of sonic vibration, and the other from an entirely separate source of sonic vibration.

The system of FIGS. 5 et seq. also presents the case wherein the variations of the actual geometry and for the order of physical dimensions of the two parts results in elastic waves or vibrations which have different velocities of propagation. For example, the longitudinal waves or vibrations in the bushing have a velocity of propagation differing from lateral or dilational wave or vibration modes in the member 133.

The system of FIGS. 5 et seq. is also an example of the use of one part having a more inductive vibratory response to the operating frequency, and the other part having a more capacitative response thereto (making use of electrical analogues as referred to hereinabove). In the present case, the large member 131 has considerable limberness or flexibility, more so than the bushing 135, or the vibratory system of which the latter forms a part. Out-of-phase relative vibrations, such as lead to cyclic loosening of the parts and reduction of friction, are thereby promoted.

It will be clear that the process can also be carried out by setting up vibrations in only the sonic beam 188, so that the member 131 is sonically vibrated, for example, in a dilatonal mode, while the bushing 135 is forced down. Conditions generally resembling or equivalent to those described above are thereby established, with the difference that the source of sonic vibrations is now coupled in the first instance to the part 131 instead of to the part 136.

Also, both sonic beams can be vibrated simultaneously, or alternately. If simultaneously, the vibrations can be of the same frequency, particularly if the sonic beams are of similar materials and dimensions, and thus possessed of resonant frequencies which are either identical or close to one another. By modification of dimensions, or choice of different materials, such as steel and duraluminum, different resonant frequencies can be achieved. In the former case, the vibrations can be in step with one another, though there will in general be a useful phase difference because of different dimensions and geometry. In the latter case, the vibrations are not in step, and substantial differentals of vibratory motion are achieved. These all constitute desirable modes of practicing the invention, and it will be understood that particular modes will sometimes be found uniquely suited to particular applications.

A number of illustrative applications of the invention have now been described. Many variations will occur to those skilled in the art, and are to be considered as falling within the scope of the broader of the appended claims.

I claim:

1. The process of causing two elements which are in tight fitting frictional interference arrangement with each other along an interface to move relatively to one another with reduced resistance along said interface, that comprises:

transmitting sonic resonant vibration through at least one of said elements, to a region adjacent said interface, such as to reduce friction between said elements at said interface, and exerting between said elements a force directed to relatively move said elements along said interface, and at a magnitude sufficient to relatively move said elements at the level to which friction therebetween has been reduced by said sonic vibration, and leaving said elements assembled, said sonic vibration being directly transmitted to said one of said elements and causing a corresponding sonic vibration but at a reduced amplitude to be induced in the other of said elements by sonic energy transmission, with acoustic attenuation, across said interface.

2. The process of causing two elements which are in tight fitting frictional interference arrangement with each other along an interface to move relatively to one another with reduced resistance along said interface, that comprises:

transmitting sonic resonant vibrations of similar mode through each of said elements, to a region adjacent said interface, such as to reduce friction between said elements at said interface, and exerting between said elements a force directed to relatively move said elements along said interface, and at a magnitude sufficient to relatively move said elements at the level to which friction therebetween has been reduced by said sonic vibration, and leaving said elements assembled, said vibrations being caused to have different velocities of transmission in the elements by using elements of different dimensions.

3. The process of causing two elements which are in tight fitting frictional interference arrangement with each other along an interface to move relatively to one another with reduced resistance along said interface, that comprises:

transmitting sonic resonant vibrations through each of said elements, to a region adjacent said interface, such as to reduce friction between said elements at said interface, and exerting between said elements a force directed to relatively move said elements along said interface, and at a magnitude sufficient to relatively move said elements at the level to which friction therebetween has been reduced by said sonic vibration, and leaving said elements assembled, an inductively reactive vibration response being induced in one of the parts and a capacitively reactive vibration response being induced in the other of said parts, whereby out of phase relative vibration of the parts occurs at the interface.

References Cited

UNITED STATES PATENTS

| | | | |
|---|---|---|---|
| 3,016,604 | 1/1962 | Castelvecchi | 29—255 |
| 3,222,767 | 12/1965 | Ashurkoff et al. | 29—252 |
| 3,334,086 | 12/1965 | Balamuth | 29—525 |
| 3,245,138 | 4/1966 | DeWilde | 29—525 X |

CHARLIE T. MOON, Primary Examiner

U.S. Cl. X.R.

29—252